(12) United States Patent
Abdel-Hady et al.

(10) Patent No.: US 7,205,692 B2
(45) Date of Patent: Apr. 17, 2007

(54) RING-SPINNING SYSTEM FOR MAKING YARN HAVING A MAGNETICALLY-ELEVATED RING

(75) Inventors: Faissal Abdel-Hady, Auburn, AL (US); Yehia Elmoghazy, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 10/528,483

(22) PCT Filed: Sep. 23, 2003

(86) PCT No.: PCT/US03/30317

§ 371 (c)(1),
(2), (4) Date: Mar. 22, 2005

(87) PCT Pub. No.: WO2004/027129

PCT Pub. Date: Apr. 1, 2004

(65) Prior Publication Data

US 2006/0022538 A1    Feb. 2, 2006

Related U.S. Application Data

(60) Provisional application No. 60/412,738, filed on Sep. 23, 2002.

(51) Int. Cl.
*H02K 7/09* (2006.01)
(52) U.S. Cl. .................................................. 310/90.5
(58) Field of Classification Search ................ 310/90.5; 318/730; 57/75, 83, 98, 124, 264
See application file for complete search history.

(56) References Cited

U.S. PATENT DOCUMENTS 2,932,152 A    4/1960  Jackson
3,851,448 A    12/1974 Sano et al.
5,740,666 A    4/1998  Yamaguchi et al.
6,049,148 A *  4/2000  Nichols et al. ........... 310/68 B (Continued)

OTHER PUBLICATIONS

Batra, Subhash K., Ghosh, Tushar K., Zeidman, Mishu I.; "An Integrated Approach to Dynamic Analysis of the Ring Spinning Process, Part I: Without Air Drag and Coriolis Acceleration"; Textile Research Journal; Aug. 1, 1988; pp. 309-317.

(Continued)

*Primary Examiner*—Thanh Lam
(74) *Attorney, Agent, or Firm*—Haverstock & Owens LLP

(57) ABSTRACT

A ring-spinning system for making yarn characterized in part by the replacement of the ring traveler configuration with only one rotating, floating ring that has an eye on its inner middle surface. This rotating, floating ring with the eye thereon performs the functions previously performed by the ring traveler configuration of twisting the fibers into yarn. The ring is kept suspended in space by the magnetic levitation system of the present invention. The floating ring is elevated by a well-controlled magnetic field generated by two sets of electromagnetic coils and a set of cylindrical rare earth permanent magnets. The floating ring is rotated around its center by the effect of winding the formed yarns over a rotating spindle at the center of the ring. Sensors and a feedback system are used to control the magnetic fields produced by the electromagnetic coils to maintain the ring in its central position.

12 Claims, 14 Drawing Sheets

U.S. PATENT DOCUMENTS

| | | | |
|---|---|---|---|
| 6,223,512 B1 * | 5/2001 | Koltze et al. | 57/67 |
| 6,446,424 B2 | 9/2002 | Thierron | |
| 6,573,628 B1 | 6/2003 | Sloupensky et al. | |
| 2003/0080638 A1 * | 5/2003 | Shinozaki | 310/90.5 |

OTHER PUBLICATIONS

Batra, Subhash K., Ghosh, Tushar K., Zeidman, Mishu I.; "An Integrated Approach to Dynamic Analysis of the Ring Spinning Process, Part II: With Air Drag"; Textile Research Journal; Aug. 1, 1988; pp. 416-424.

Charara, A. & Caron, B.; "Magnetic Bearing: Comparison Between Linear and Nonlinear Functioning"; Proceedings of the Third International Symposium on Magnetic Bearings; Jul. 29-31, 1992; Radisson Hotel at Mark Center, Alexandria, Virginia; pp. 451-460.

DeBarr, A.E.; "A Descriptive Account of Yarn Tensions and Balloon Shapes in Ring Spinning"; Textile Institute; Nov. 26, 1957; pp. T58-T88.

DeBarr, A.E.; "The Physics of Yarn Tension and Balloon Shapes in Spinning, Winding and Similar Processes"; Textile Institute; Oct. 30, 1959; pp. T16-T38.

DeBarr, A.E., "The Role of Air Drag in Ring Spinning"; Textile Institute; Jan. 13, 1961; pp. T126-T139.

Dhar, D., Barrett, L.E., Knospe, C.R.; "Optimum Design of Decentralized Magnetic Bearings for Rotor Systems"; Proceedings of the Third International Symposium on Magnetic Bearings; Jul. 29-31, 1992; Radisson Hotel at Mark Center, Alexandria, Virginia; pp. 47-59.

Herzog, R.; "A Comparison Between "Passively"and "Actively"Controlled Magnetic Bearings"; Proceedings of the Third International Symposium on Magnetic Bearings; Jul. 29-31, 1992; Radisson Hotel at Mark Center, Alexandria, Virginia: pp. 223-231.

Meeker, David C., Maslen, Eric H., Noh, Myounggyu D.; "A Wide Bandwidth Model for the Electrical Impedance of Magnetic Bearings"; Dec. 1995; 3rd International Symposium on Magnetic Suspension Technology, Tallahassee, Florida: pp. 387-401.

Skenderi, Zenun, Oreskovic, Vladimir, Peric, Petar; "Determining Yarn Tension in Ring Spinning"; Textile Research Journal 71(4); Apr. 2001; pp. 343-350.

* cited by examiner

Stator assembly with Floating ring and Spacers

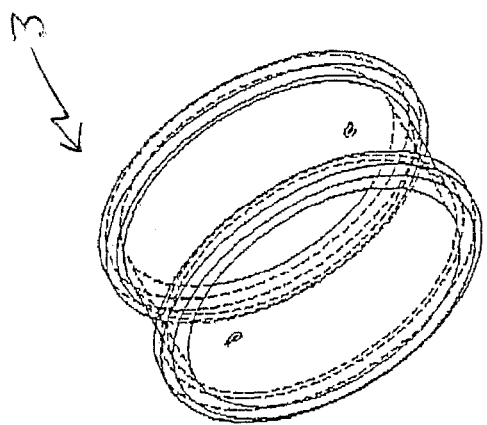
Floating Ring
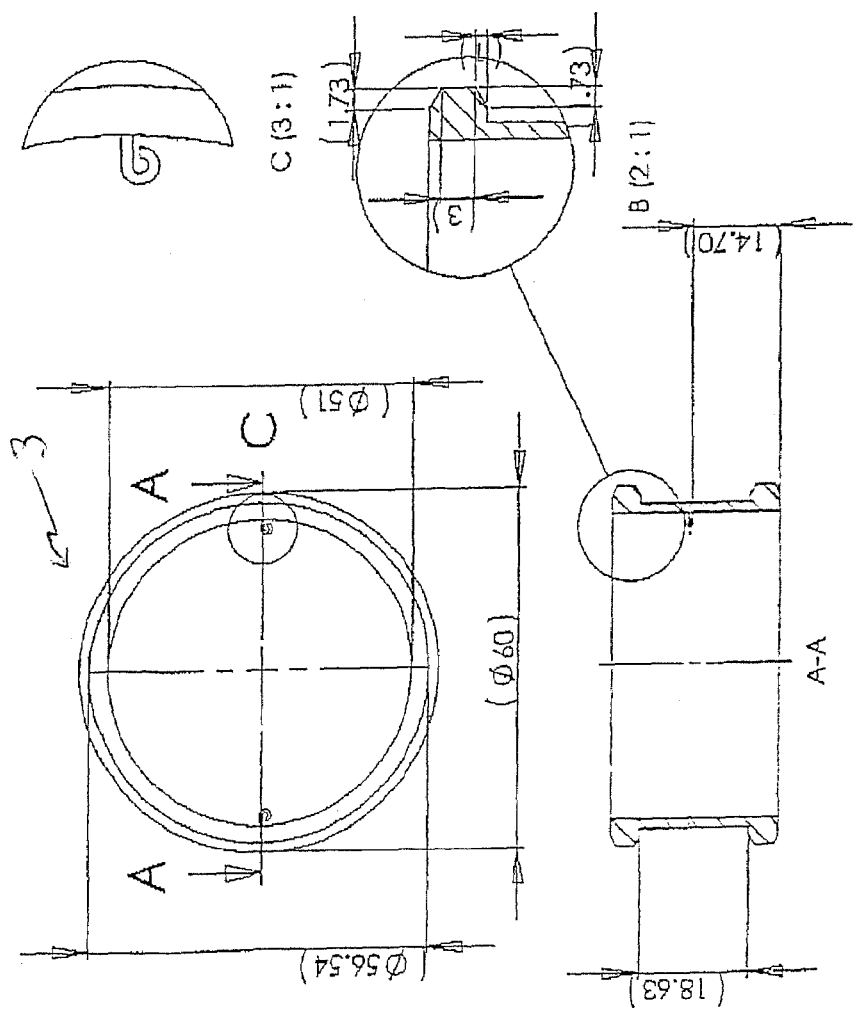
Fig. 4

FIG. 5  Stator Main body

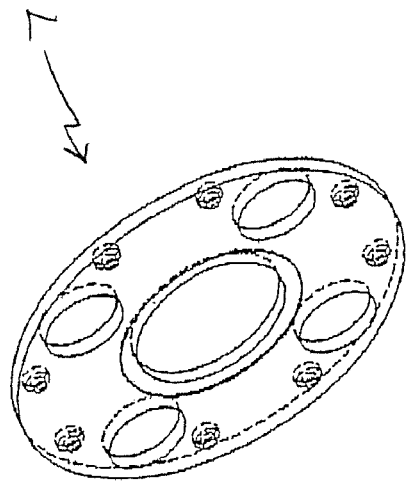
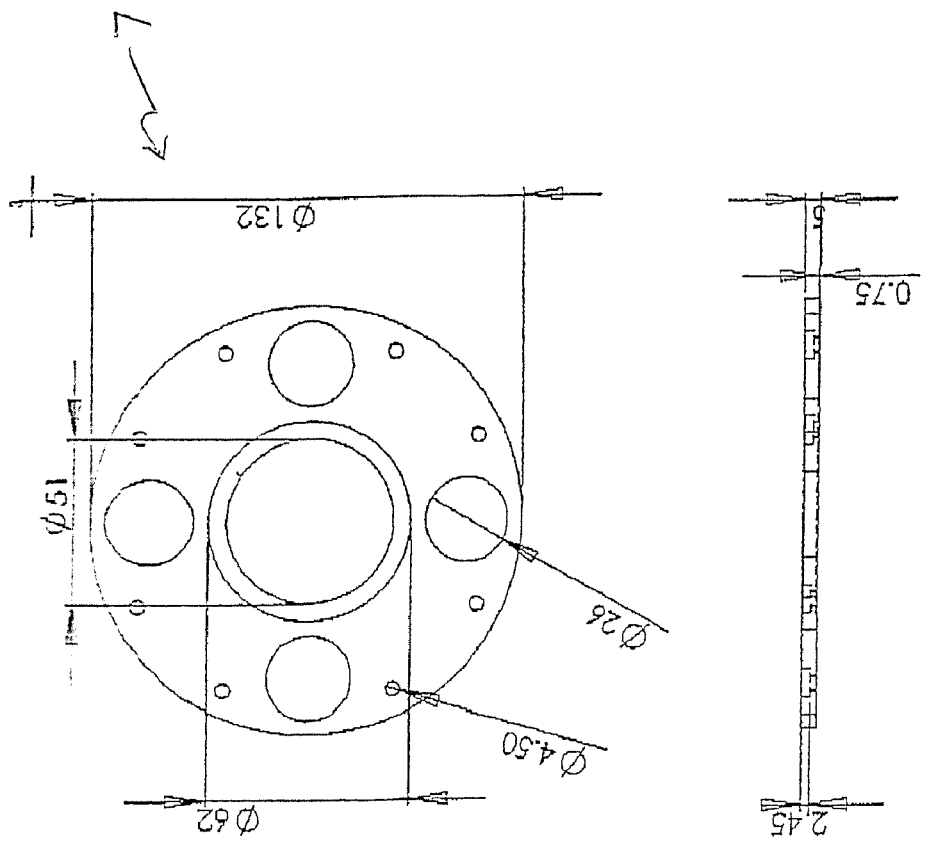
Axial supporting disk
Fig. 8

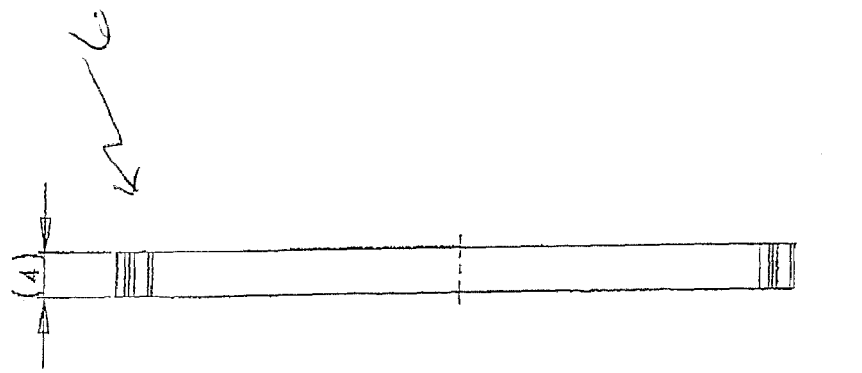
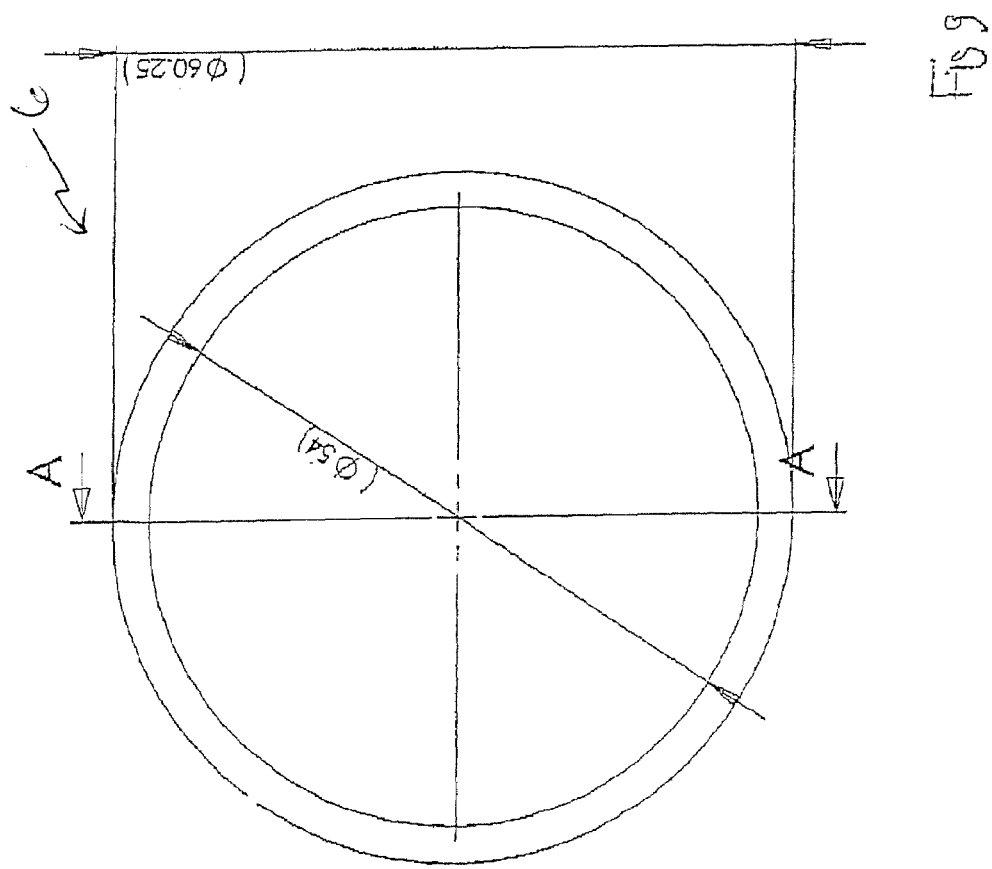
Fig 9

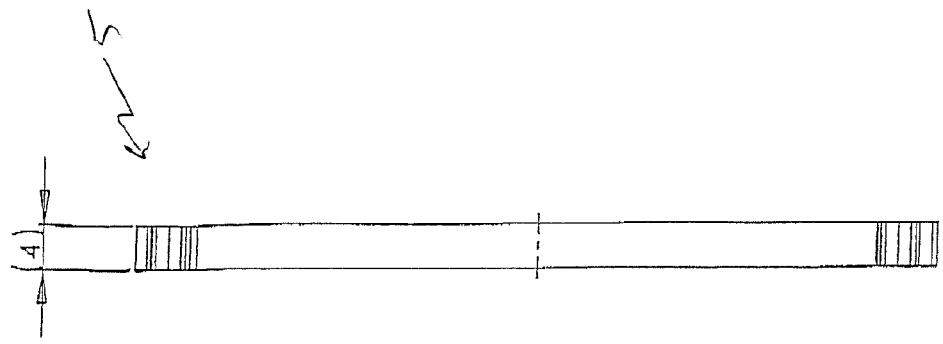
A-A (2:1)
Stator Spacer
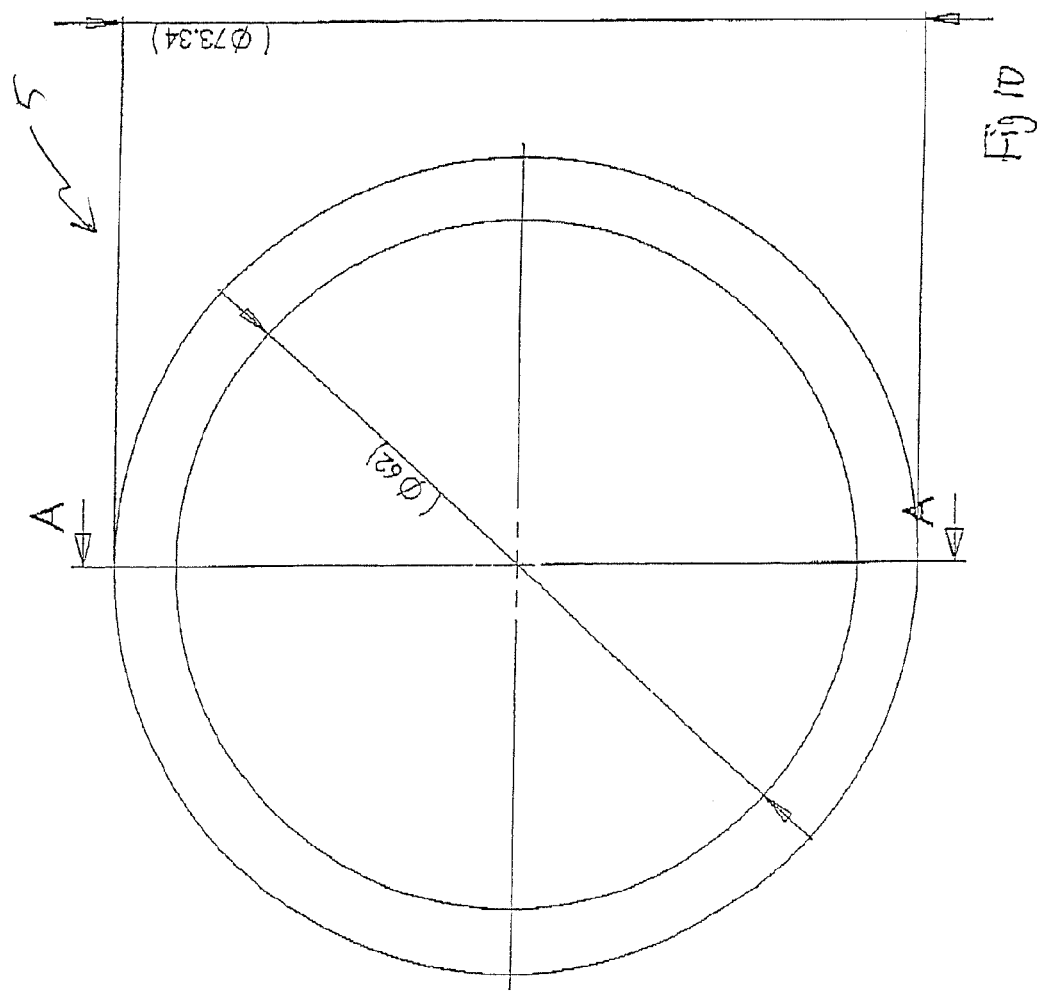
Fig 10

RING-SPINNING SYSTEM FOR MAKING YARN HAVING A MAGNETICALLY-ELEVATED RING

The U.S. Government has a paid-up license in this invention and the right in limited circumstances to require the patent owner to license others on reasonable terms as provided for by the terms of Grant No. 99-27-07400 awarded by the Department of Commerce and the National Textile Center.

TECHNICAL FIELD OF THE INVENTION

The present invention is related to manufacturing yarn from fiber strands and, more particularly, to a ring-spinning system for manufacturing yarn that employs a magnetically-elevated ring.

BACKGROUND OF THE INVENTION

Spinning is the process of forming yarns from fiber strands. The existing spinning systems may be divided into two main categories, namely, continuous spinning systems and non-continuous spinning systems. In continuous spinning, the fiber strand fed to the spinning system follows a continuous path throughout the entire spinning process from the feeding point to the yarn package. Ring spinning and compact spinning are two examples of continuous spinning systems. Continuous spinning systems generally produce high-quality yarn, and a wide diversity of yarn styles, but suffer from a low productivity rate. On the other hand, non-continuous spinning systems generally have high production rates, but produce relatively low-quality yarn.

The main factor that limits the production rate of ring-spinning systems is the friction between the traveler and the ring. This friction generates heat sufficient to burn the traveler if its speed is increased over a certain limit. Therefore, either the speed of the system must be kept below a certain limit to prevent damage to the traveler and/or the traveler will be damaged and will have to be replaced frequently. Various attempts have been made to reduce the friction between the traveler and the ring. For example, U.S. Pat. Nos. 2,932,152 and 3,851,448 disclose ring-spinning systems wherein the ring is supported in space by either magnetic force or air pressure to prevent the ring from contacting the stationary parts of the system.

These two systems use air pressure to stabilize the ring in the transverse direction in addition to the magnetic repulsion force. Simultaneously using two different types of stabilizing forces to stabilize the ring complicates the ring-spinning system and makes the system unsuitable for industrial applications because the stabilizing forces tend to be difficult to control. Moreover, the absence of a control system makes such systems uncontrollable in the case of start-up operation and in the case of yarn breakage. In addition, the power required by such systems to provide the necessary air pressure and magnetic forces renders them unsuitable for industrial application because they are economically inefficient.

A need exists for a ring-spinning system in which the speed and productivity limitations imposed by the traveler are eliminated. A need also exists for a ring-spinning system that utilizes a suspended ring and that has the ability of stabilizing the suspended ring with a high degree of precision. A need also exists for a ring-spinning system that is capable of producing high quality yarn at a high rate of production, and that is economical in terms of power consumption.

SUMMARY OF THE INVENTION

The present invention provides a ring-spinning system characterized in part by the replacement of the ring traveler configuration with only one rotating, floating ring that has an eye on its inner middle surface. This rotating, floating ring with the eye thereon performs the functions previously performed by the ring traveler configuration of twisting the fibers into yarn. The ring is kept suspended in space by the magnetic levitation system of the present invention.

In accordance with the preferred embodiment of the present invention, a floating ring is levitated by a well-controlled magnetic field generated by two sets of electromagnetic coils and a set of cylindrical rare earth permanent magnets. The floating ring is rotated around its center by the effect of winding the formed yarns over a rotating spindle at the center of the ring. Sensors and a feedback system are used to control the magnetic fields produced by the electromagnetic coils to maintain the ring in its central position. The sensors preferably are inductive sensors that detect the displacement of the floating ring off its center axis and send information to a controller of the feedback system. The controller outputs signals in response to the received information that cause the magnetic force generated by the coils to be adjusted, which causes the ring to be restored to its central position.

These and other features and advantages of the present invention will become apparent from the following description, drawings and claims.

BRIEF DESCRIPTION OF THE DRAWINGS

FIG. 4 is detailed drawing of the floating ring
FIG. 8 is a detailed drawing of the support disk in the Z direction.
FIG. 9 is a floating ring touchdown spacer to keep a minimum air gap distance of 0.25 mm between the floating ring and the flux plates.
FIG. 10 is a counter spacer of the floating ring touchdown spacer.

DETAILED DESCRIPTION OF THE PREFERRED EMBODIMENTS OF THE INVENTION

In accordance with the present invention, a magnetic ring-spinning device is provided that is capable of supporting a rotating ring in a stable manner around its center without touching the stator part. A rotating spinning ring has an eye that performs the functions equivalent to those performed by the traveler in a conventional ring-spinning system. The ring having the eye will be referred to herein as the "floating ring". This floating ring 3 preferably has a form of a short cylinder with two flanges at its ends. The floating ring may be made from many materials, but preferably is made of a silicon steel material in accordance with the preferred embodiment of the present invention.

Figure 1:
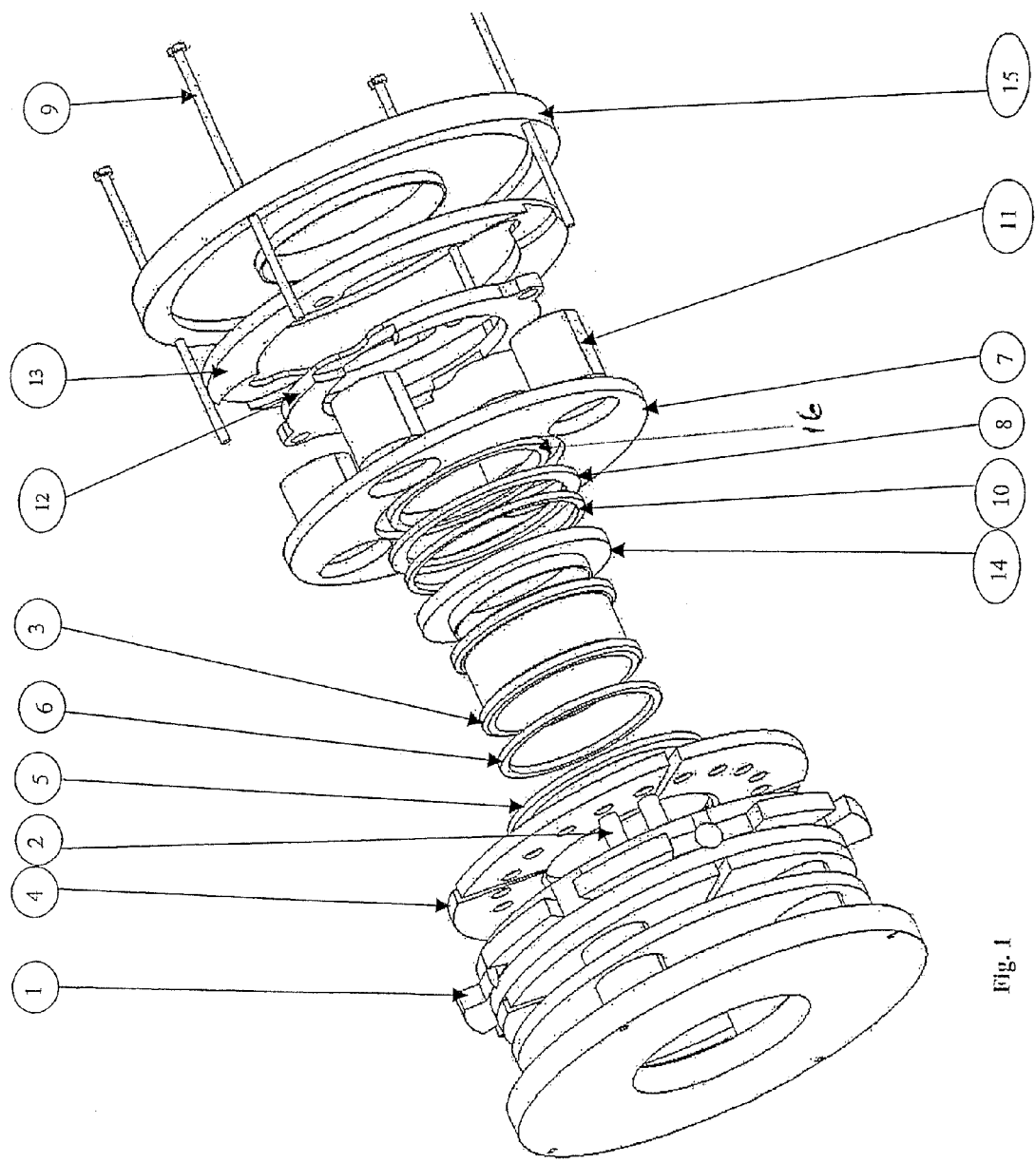
FIG. 1 is an exploded view of the complete mechanical assembly of the present invention.
Figure 2:
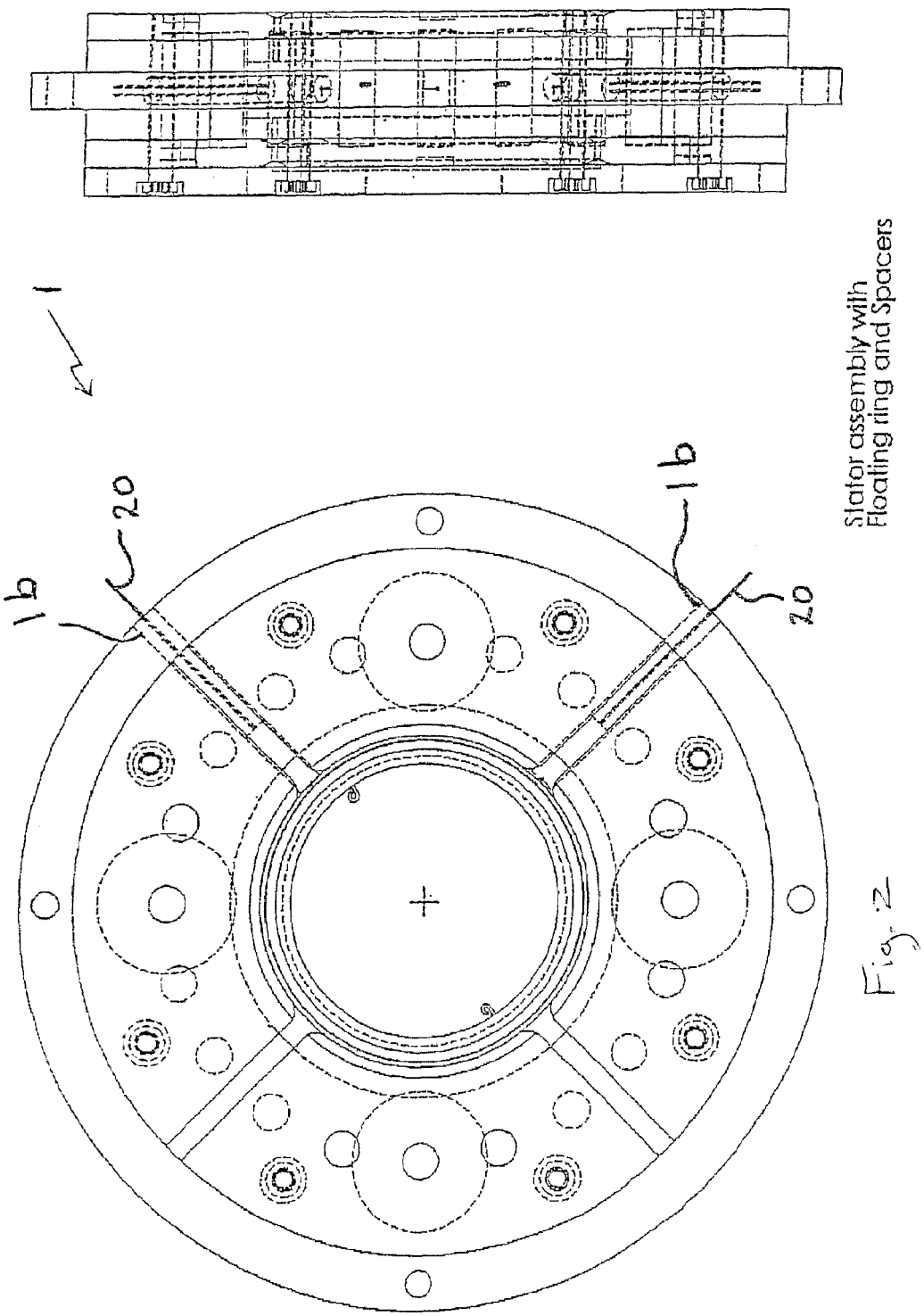
FIG. 2 is a detailed drawing of the stator assembly
Figure 5:
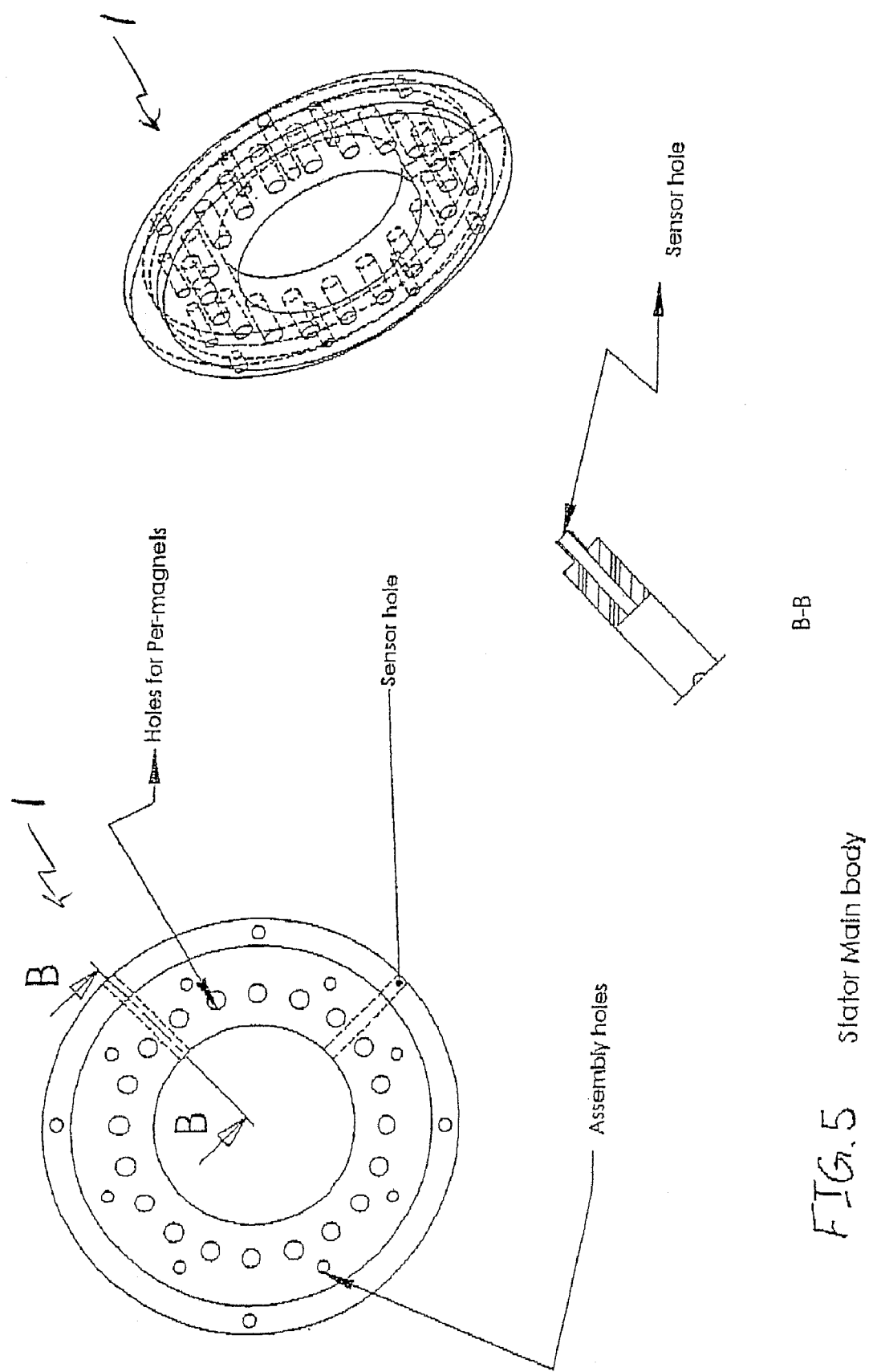
FIG. 5 is a detailed drawing of the stator body

The components of the ring-spinning system in accordance with the preferred embodiment are shown in FIG. 1. The system comprises a stator 1 that has axial holes formed therein for receiving the cylindrical-shaped rare earth permanent magnets 2. The stator 1 also preferably has two radially-extending holes 1b (FIG. 2) for accommodating two respective displacement sensors 20 (FIG. 2), which preferably are of the inductive type. The stator body 1 in accordance with the preferred embodiment is shown in FIG. 5.

Figure 6:
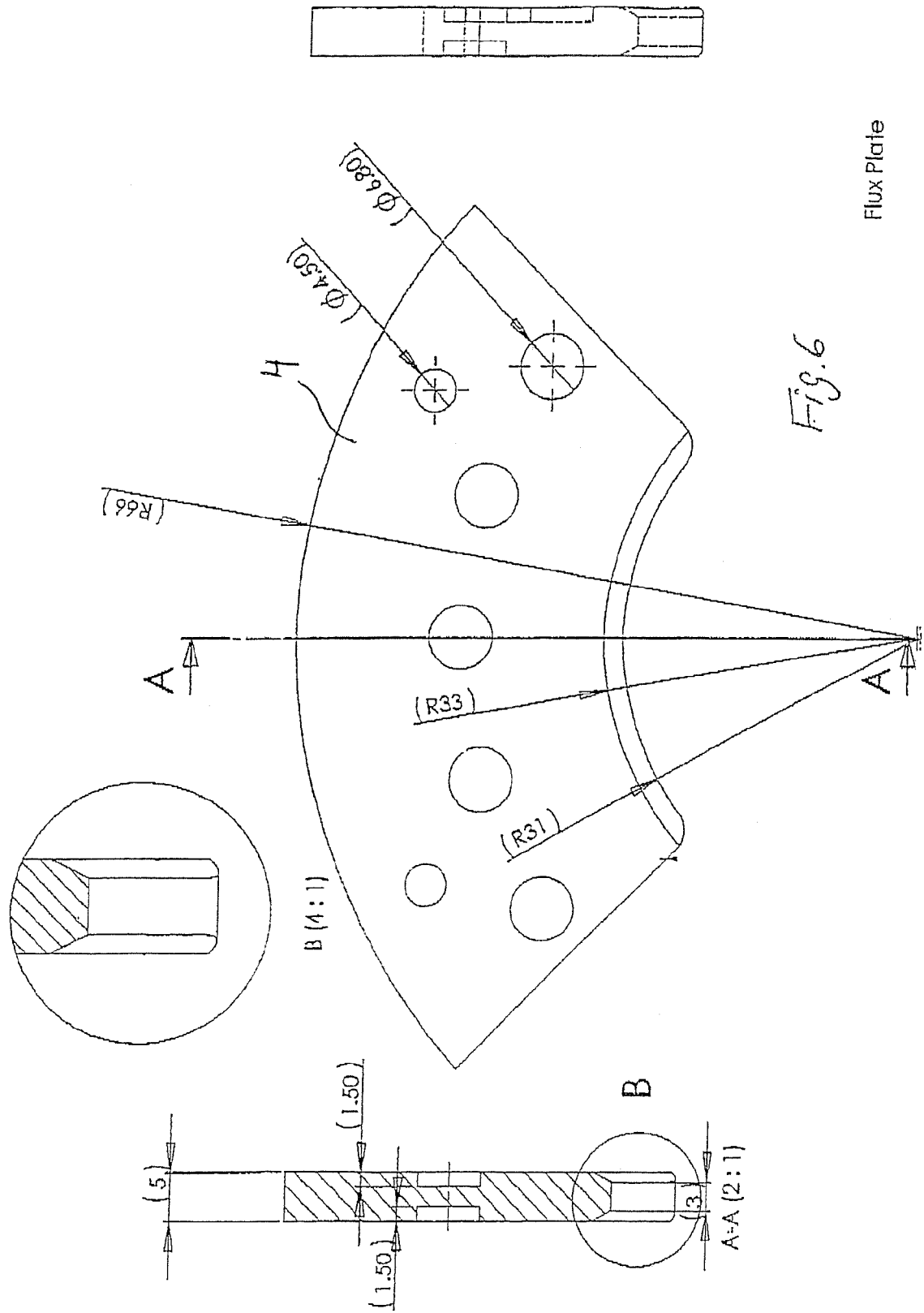
FIG. 6 is a detailed drawing of the flux plates

Two sets of flux plates 4, 12 and 13 provide return flux paths for the system. The design of one of the flux plates 4 is shown in FIG. 6. The system is symmetric with respect to its components. The left side of the system in FIG. 1 is shown assembled whereas the right side is shown disassembled. Therefore, only the disassembled components will be described. Each flux plate 4 preferably has five blind holes on one side and one blind hole on the other side. The five holes are made for insertion of the ends of the permanent magnets 2 and the other hole is made for insertion of the end of the electromagnet core. These plates 4 preferably are made of silicon steel material. Eight electromagnet coils 11 are included in the system. Only four of the coils 11 are shown in the disassembled portion of FIG. 1. The coils 11 preferably have silicon steel cylindrical cores. These coils 11 are arranged in two sets. One set is located on one side of the stator 1 and the other set on the other side in symmetrical way.

Figure 7A:
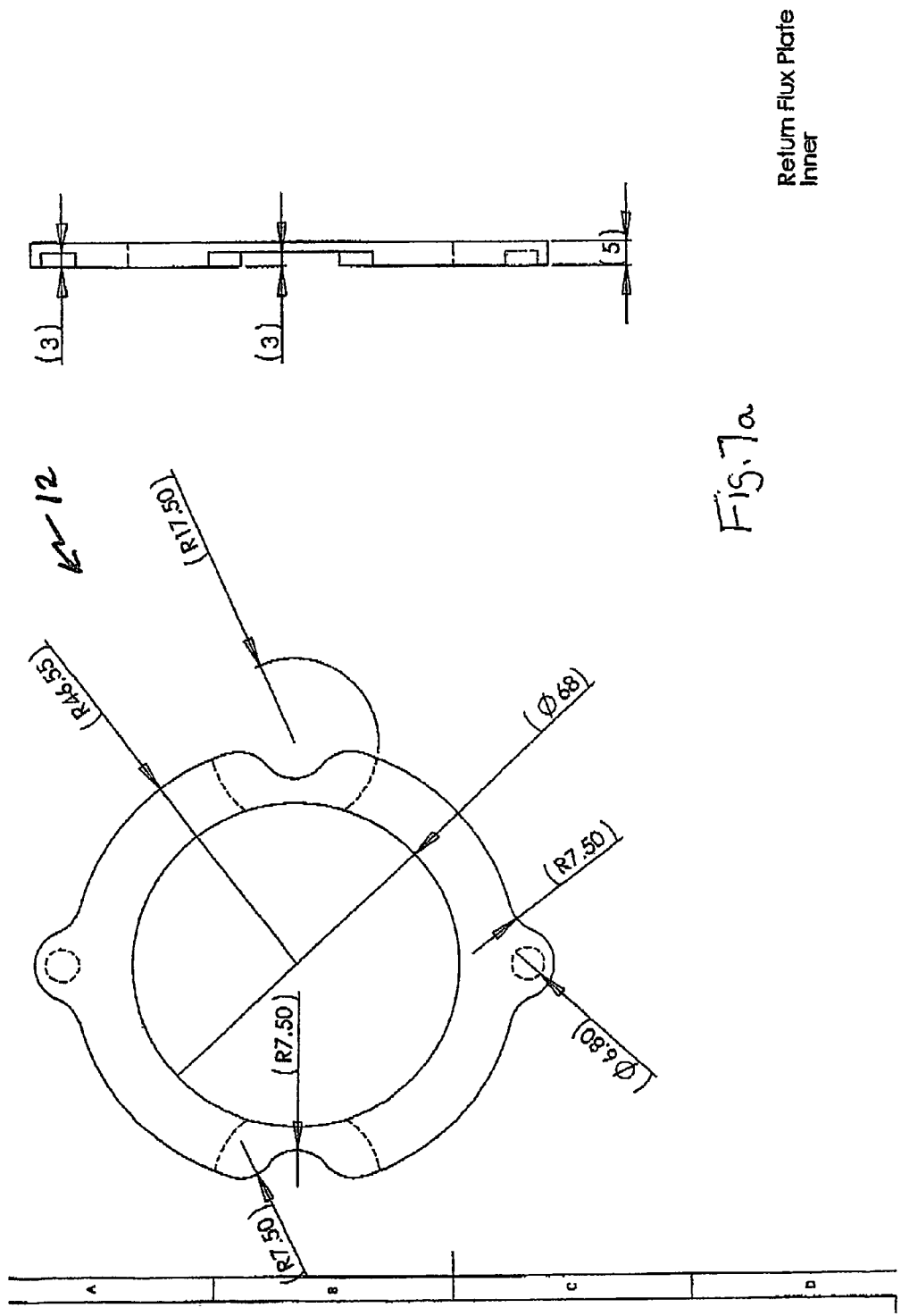
FIGS. 7*a* and 7*b* is a detailed drawing of the return flux plates (outer and inner).
Figure 7B:
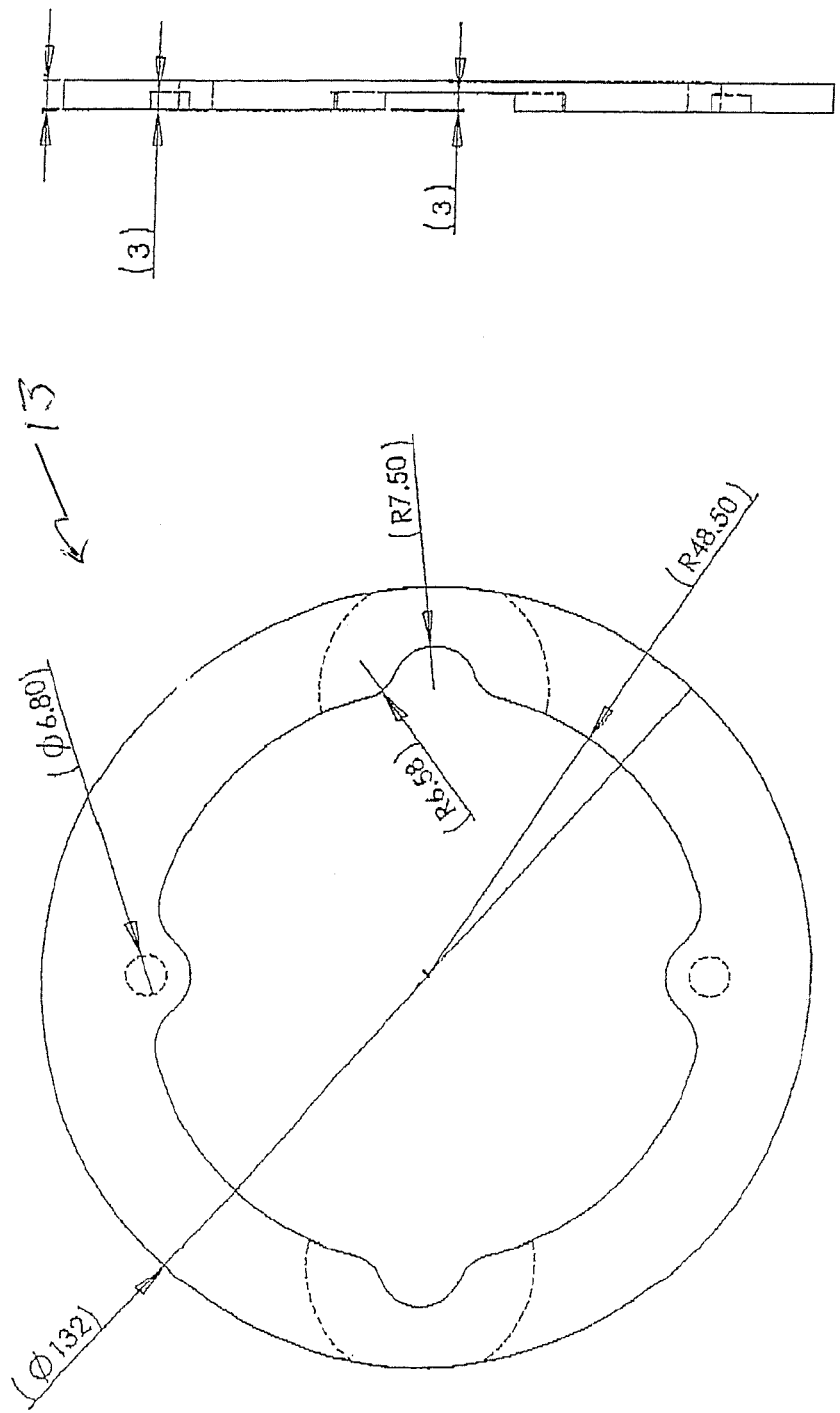

Two sets of return flux path plates 12 and 13 are incorporated into the system. Each set includes two separate semicircular pieces. Each piece connects two coils from one side of the system, which will be referred to hereinafter as X-coils or Y-coils. These return flux path plates 12 and 13 preferably are made of silicon steel material. The preferred design of the flux plates is shown in FIGS. 7A and 7B. A passive supporting bearing subassembly 7, 8, 10 and 14 (FIG. 1) provides support for the axial positioning of the rotating floating ring 3. This subassembly includes two annular disks 14 and 16 having annular grooves where ring permanent magnets 8 and 10 are installed. One of the annular disks 14 is mounted on the floating ring 3 and has a groove formed in it in which one of the ring permanent magnets 10 is installed. The other annular disk 16 in which the other ring permanent magnet 8 is installed is mounted on stationary support part 7. The stationary support part 7 in accordance with the preferred embodiment is shown in FIG. 8. The preferred designs for the floating ring spacer 6 and the stator spacer 5 are shown in FIGS. 9 and 10, respectively.

Figure 3:
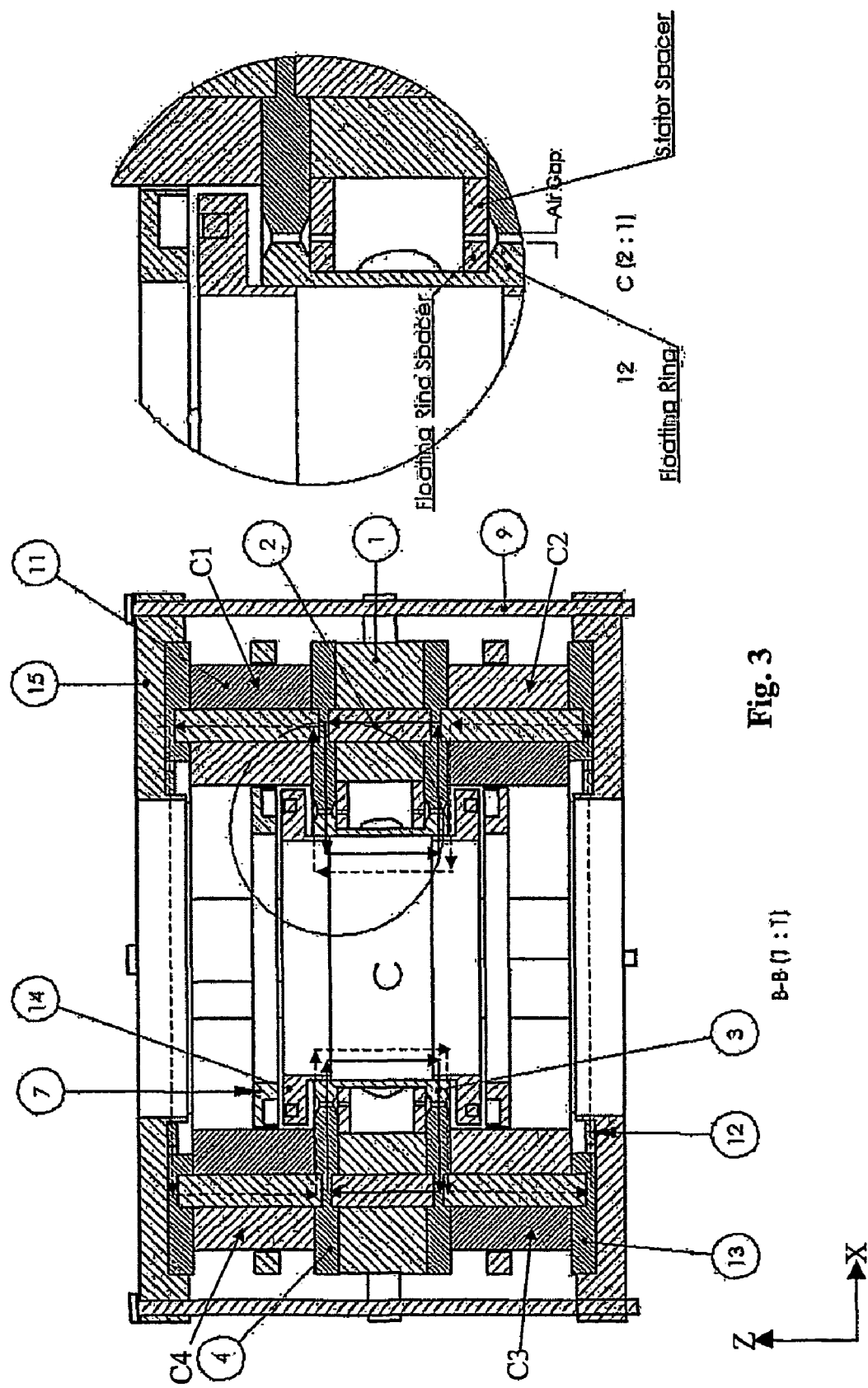
FIG. 3 is a sectional view of the complete assembly

The ring permanent magnets 8 and 10 are arranged to operate in a repulsive mode. This arrangement is capable of supporting the rotating ring 3 in the axial direction during rotation. FIG. 4 illustrates the design of the floating ring 3 in accordance with the preferred embodiment. The ring-spinning system device is assembled together by eight non-ferrous material bolts. FIG. 3 shows the principal of operation of the system of the present invention. The permanent magnets 2 (FIG. 1), which are arranged on the stator body 1 (FIG. 1) uniformly, are used to generate a fixed magnetic field capable of supporting the floating ring 3 (FIG. 1) in the Z direction (i.e., the axial direction of the system). The electromagnetic coils 11 are arranged in two sets; one set of 4 coils working in the X direction and the other set working in the Y direction. Each set includes two groups of coils. Each group has two coils arranged on the two sides of the stator body 1 and the flux plates 12 and 13 between them.

In FIG. 3, the floating ring 3 is shown displaced a small distance off its central position to the right, or in +X direction. The dotted lines in FIG. 3 represent the magnetic field intensity generated by coils 11 (C1, C2 excited in one direction and C3, C4 excited in the other direction). The arrows on that line show the direction of the field. On the other hand, the permanent magnets 2, generate two field intensity paths shown as solid lines with the arrows indicating the direction of the field lines. Examining the right hand side air gap, which has a smaller gap than the left side gap, the net magnetic field intensity is the difference between the field generated by the permanent magnet 2 and the one generated by the coils C1 and C2. On the other side, the net magnetic field intensity is the sum of the two fields. In other words, the magnetic field intensity at the smaller air gap is reduced and the field intensity at the larger air gap is increased. Therefore, the net restoring force acting on the floating ring 3 will act in the −X direction, i.e. to restore the ring to its central position. The same principal works as well in the Y direction. Therefore, by controlling the direction and value of the current passing through the coils C1, C2, C3 and C4 the ring 3 can be centered.

The modification of the field intensity at the air gap may be referred to as field modulation. The two sets of the electromagnetic coils 11(C1–C4) and their flux paths are separated by using the two return path plates 12 and 13 (FIGS. 1, 7A and 7B), which preferably have about 5 millimeter (mm) air gap between them. This arrangement eliminates, with a great success, the coupling between the X and Y sets of coils 11.

Figure 11:
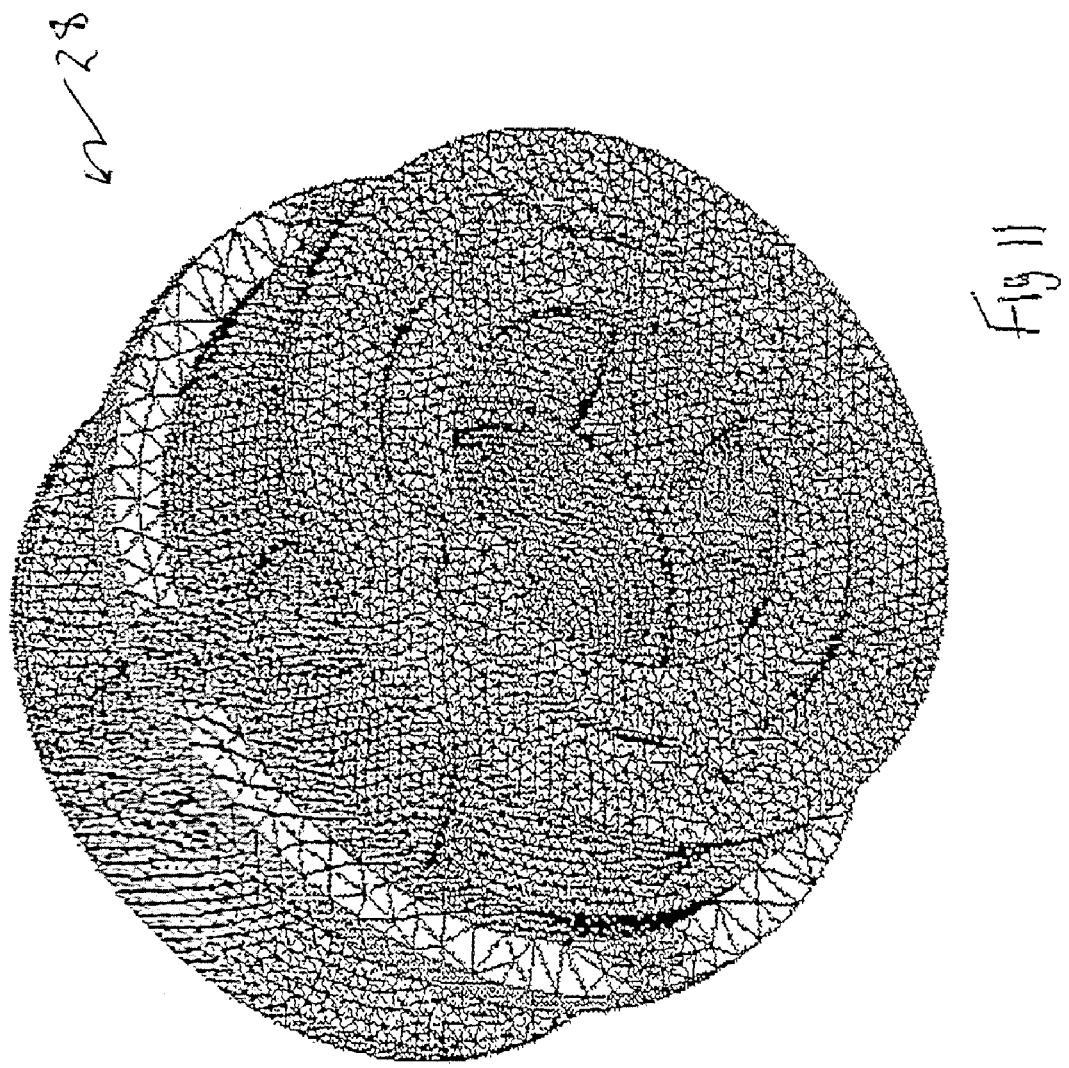
FIG. 11 is a finite element mesh of the complete invention.

For full validation of the present invention, a complete finite element model 28 was carried out, as shown in FIG. 11. The real model was enclosed within a cylinder of air with a greater diameter than the model by 150% and greater in height by 150%. This was needed to apply far field boundary conditions at the surfaces of that cylinder. These boundary conditions were imposing a tangential flux field at all the bounding surfaces of that cylinder. FIG. 11 shows the model meshed with air cylinder removed. The total number of elements used to mesh this model is 370000. This huge number of elements is used in order to obtain the most accurate results. On the other hand, the time taken to perform one run is about 10 min. This type of analysis has the advantage over the other methods (i.e. closed form solution . . . ) in that there is no simplification of the model geometry and it takes into consideration any flux leakage.

Figure 13:
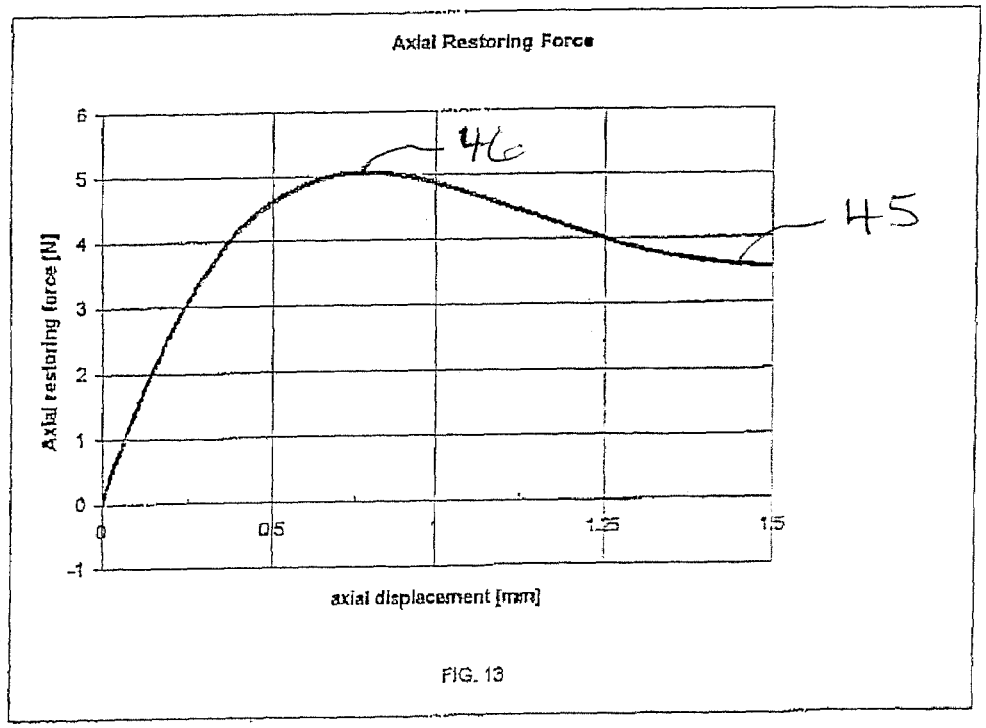
FIG. 13 is a chart of the restoring force in the Z direction versus the displacement of the floating ring in the Z direction and concentric with the stator body.

The present invention was studied with the floating ring displaced from the stator center incrementally 0.25 mm step in the X direction. Another study was carried out with the floating ring displaced in the Z direction to get the holding force in the Z direction that will support the ring weight and the axial force resulting from the yarn tension. For the current configuration, the holding Z force calculated (FIG. 13) is found to be about 5 [N]. This force is greater than the sum of the floating ring weight and fiber tension in the Z direction by 5 times.

The materials used to manufacture the different components of the current invention are: the stator body is made of Aluminum or any non-magnetic material, the flux plates, floating ring and return flux plate are made of silicon iron, the floating ring spacers, the stator spacers and the axial disk support are made of plastic. The electric and magnetic properties of all these materials are available in any material handbook.

Figure 12:
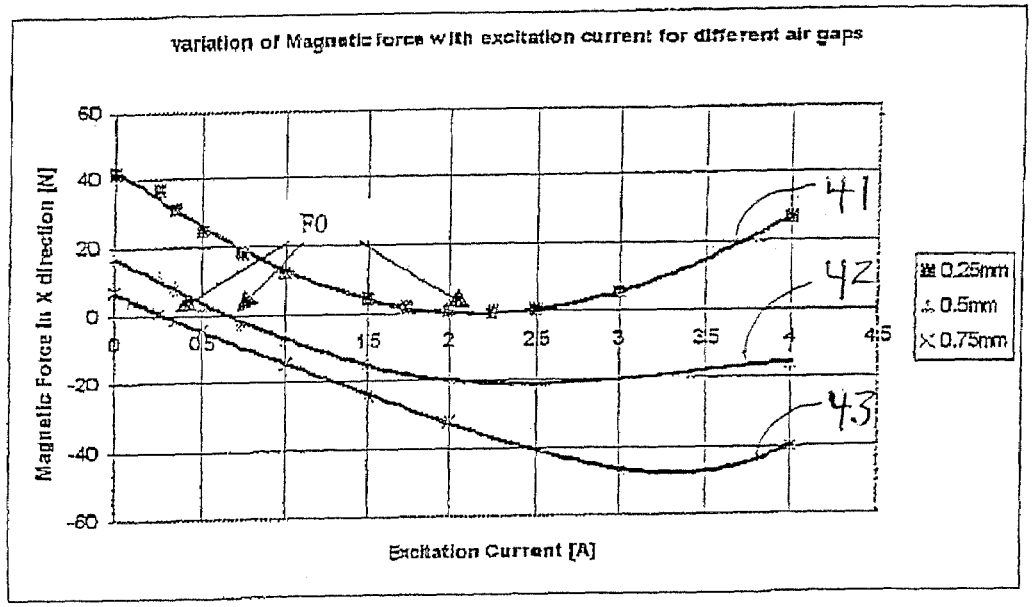
FIG. 12 is a chart of the restoring force versus the current applied to the 4 X-Coils at 0.25, 0.5 and 0.75 mm gap between the floating ring and the flux plates in the X direction.

FIG. 12 shows the relation between the restoring force and the excitation current for 0.25, 0.5, 0.75 mm displacement of the floating ring from its central position, as indicated by curves 41, 42 and 43, respectively. At the point (F0) of intersection with the current axis the sum of the forces acting on the ring is equal to zero. This does not mean that there is no force holding the ring at that point, but the force holding the ring in the X direction is equal to the force in the −X direction. So, by increasing the current with a small amount the ring will start to move in the direction where the air gap is larger. By this action the floating ring win restore its central position, as represented by curve 45 in FIG. 13.

FIGS. 8, 9 and 10 show nonmagnetic spacers 5 and 6 and the supporting disk 7. As described above, the two spacers 5 and 6 are mounted on the floating ring 3 and the other two (not shown) are mounted on the stator body 1 facing the other two spacers 5 and 6. The clearance between the facing spacers preferably is designed to be 0.75 mm in order to leave a 0.25 mm as an air gap between the floating ring and the stator. This 0.25 mm air gap is important in start up of the device. Of course, the present invention is not limited to any particular dimensions for the components described herein. However, for this particular design it has been determined that if this gap is less than this value the field modulation will not be able to pull the floating ring away from the stator. However, inversely, the magnetic force will increase in the direction of closing that gap more. This is quit clear from FIG. 12 at the 0.25 mm gap curve 31, where it can be seen that this curve is nearly tangent to zero force at 2.25 ampere (A), and if the current is increased the force starts again to increase in the opposite direction (i.e., trying to close the small gap further).

The supporting disk 7 (support the floating ring 3 in the Z direction) will allow 1 mm for the floating ring 3 to be shifted downwards due to any unexpected disturbance. The permanent magnets 2 will still be capable of lifting the floating ring 3 up again. This action can be seen from FIG. 13 at 1 mm displacement where the resultant force in the Z direction is still about 5 Newton (N) as indicated by point 46 on curve 45.

Figure 14:
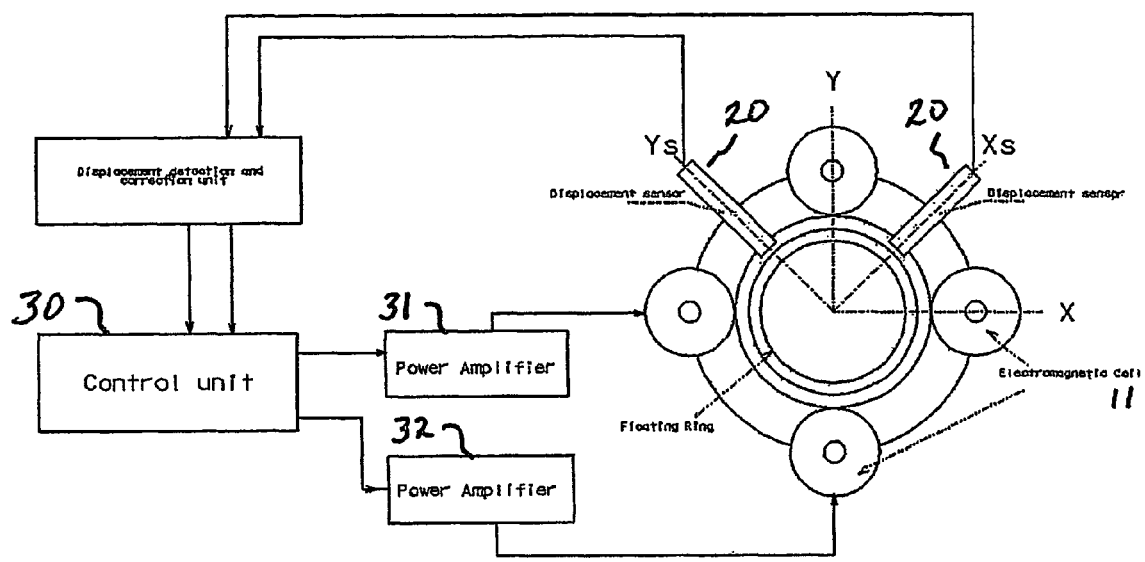
FIG. 14 block diagram of the control system of the present invention

FIG. 14 shows the feedback control system of the present invention used to maintain the floating ring in its central position in accordance with the preferred embodiment. A conventional proportional-integral-derivative (PID) controller 30 preferably is used as a core of the control system. The control system 30 uses the two displacement sensors 20 (FIG. 2) to sense the floating ring position and feeds this information back (feedback signal) to the control unit 30. The control unit 30 calculates the difference between the feedback signal and the set point value and uses this difference through the PID algorithm to generate the required output signals. These signals are then amplified by amplifiers 31 and 32 and fed to respective different sets of the electromagnetic coils 11.

It should be noted that while the present invention has been described with reference to certain preferred embodiments, the present invention is not limited to these embodiment. The present invention is not limited to any particular dimensions for the components or with respect to the materials used to make the components. Also, the present invention is not limited to any particular arrangements for the permanent magnets and the electromagnetic coils. It should also be noted that although the present invention has been described with reference to ring-spinning, the present invention is applicable to any area of technology where it is necessary or desirable to suspend some type of device during operation, such as a ring or some type of bearing, for example. Other modifications may be made to the embodiments described herein without deviating from the scope of the present invention.

What is claimed is:

1. A magnetic elevation system comprising:
   a stator assembly having a permanent magnet assembly secured thereto, the stator assembly being substantially cylindrical in shape;
   a support assembly configured to support a metallic device that is to be magnetically elevated, the permanent magnet assembly providing a magnetic force that is exerted on said metallic device in at least a first direction;
   an electromagnetic coil assembly capable of generating a magnetic force that is exerted on said metallic device in at least a second direction; and
   a feedback control system used in conjunction with a proportional-integral-derivative (PID) controller configured to detect displacement of said metallic device in at least the first and second directions and to cause the magnetic force being generated by the electromagnetic coil assembly to be varied to correct displacement of said metallic device.

2. The magnetic elevation system of claim 1, wherein the system is a ring-spinning system for making yarn, said metallic device being a ring of the ring-spinning system, the ring having an eye thereon, and wherein the ring spins as it is elevated by the magnetic forces produced by the permanent magnet assembly and by the electromagnetic coil assembly, the spinning of the ring causing the ring to be displaced from a center location in at least one direction, and wherein the feedback control system causes the magnetic force generated by the electromagnet coil assembly to be varied so as to correct for the displacement while the ring is spinning.

3. The magnetic elevation system of claim 1, wherein the permanent magnet assembly generates a magnetic force that is exerted on the metallic device in a Z direction and wherein the electromagnetic coil assembly generates a magnetic force that is exerted on the metallic device in X and Y directions, the X and Y directions being transverse to each other and transverse to the Z direction.

4. The magnetic elevation system of claim 3, wherein the feedback control system includes at least two inductive displacement sensors that detect the displacement of the metallic device and generate respective output signals having values relating to amount and direction of displacement of the metallic device.

5. The magnetic elevation system of claim 1, wherein the electromagnetic coil assembly comprises two sets of electromagnetic coils, the two sets of electromagnetic coils having the stator assembly and said metallic device disposed between them.

6. The magnetic elevation system of claim 5, wherein each set of electromagnetic coils comprises four electromagnetic coils.

7. The magnetic elevation system of claim 1, further comprising a first non-magnetic annular disk disposed on said metallic device and a permanent magnet secured to the non-magnetic spacer.

8. The magnetic elevation system of claim 7, further comprising a second non-magnetic annular disk disposed on the support assembly and a permanent magnetic secured to the second non-magnetic annular disk.

9. The magnetic elevation system of claim 8, further comprising a non-magnetic spacer disposed on said metallic device.

10. The magnetic elevation system of claim 9, further comprising a non-magnetic spacer disposed on the stator assembly adjacent the non-magnetic spacer disposed on said metallic device.

11. The magnetic elevation system of claim 5, further comprising first and second flux plates having the stator assembly, said metallic device, the support assembly and the electromagnetic coil assembly disposed between them.

12. The magnetic elevation system of claim 11, further comprising third and fourth flux plates having the first and second flux plates, the stator assembly, said metallic device, the support assembly and the electromagnetic coil assembly disposed between them.

* * * * *